(12) United States Patent
Cowett

(10) Patent No.: US 7,044,494 B1
(45) Date of Patent: May 16, 2006

(54) TOW-HITCH APPARATUS

(75) Inventor: Michael J. Cowett, Solon, OH (US)

(73) Assignee: Buyers Products Company, Mentor, OH (US)

( * ) Notice: Subject to any disclaimer, the term of this patent is extended or adjusted under 35 U.S.C. 154(b) by 0 days.

(21) Appl. No.: 11/063,269

(22) Filed: Feb. 22, 2005

(51) Int. Cl.
*B60D 1/07* (2006.01)

(52) U.S. Cl. ............................... 280/512; 280/416.1
(58) Field of Classification Search ............ 280/416.1, 280/511, 515, 452, 454, 436, 437, 512
See application file for complete search history.

(56) References Cited

U.S. PATENT DOCUMENTS

| | | | | |
|---|---|---|---|---|
| 3,730,558 A * | 5/1973 | Litzenberger | ............... | 280/511 |
| 3,759,548 A * | 9/1973 | Kothmann | .................. | 280/511 |
| 3,779,653 A * | 12/1973 | Charlton | ....................... | 403/3 |
| 3,922,006 A | 11/1975 | Borges | ....................... | 280/415 |
| 4,208,065 A * | 6/1980 | Hansen | ....................... | 280/507 |
| 4,232,877 A * | 11/1980 | Milton | .................... | 280/416.1 |
| 4,568,098 A * | 2/1986 | Landry, Jr. | ............... | 280/416.1 |
| 4,729,571 A * | 3/1988 | Tienstra | .................... | 280/416.1 |
| 4,799,706 A * | 1/1989 | Myers et al. | ............... | 280/504 |
| 5,312,128 A | 5/1994 | Blacklaw | ................... | 280/512 |
| 5,725,229 A | 3/1998 | McWethy | ................ | 280/416.1 |
| 5,857,693 A * | 1/1999 | Clark, Jr. | .................. | 280/415.1 |
| 5,890,727 A | 4/1999 | May | ........................ | 280/416.1 |
| 5,908,201 A * | 6/1999 | Van Vleet | ................ | 280/416.1 |
| 6,193,258 B1* | 2/2001 | Kennedy | .................... | 280/477 |
| 6,789,815 B1 | 9/2004 | Moss et al. | .............. | 280/416.1 |
| 2003/0006581 A1* | 1/2003 | Moss et al. | .............. | 280/416.1 |
| 2004/0080140 A1* | 4/2004 | Hart | ........................ | 280/416.1 |

FOREIGN PATENT DOCUMENTS

FR     2570991 A1 *    4/1986

* cited by examiner

*Primary Examiner*—Lesley D. Morris
*Assistant Examiner*—Daniel Yeagley
(74) *Attorney, Agent, or Firm*—Kusner & Jaffe

(57) ABSTRACT

A tow hitch comprised of an elongated shank of rectangular cross-section. The shank has four side surfaces. A first tow ball of a first dimension is fixedly mounted to a first of the side surfaces. A second tow ball of a second dimension is fixedly mounted to a second of the side surfaces. A third tow ball of a third dimension is fixedly mounted to a third of the side surfaces. The first and the third tow balls are on opposite side surfaces of the shank. A jaw is mounted to the shank for pivotal movement about an axis through the shank. The jaw has a ball-engaging surface, and is movable between a first position wherein the ball-engaging surface engages one of the tow balls and a second position wherein the ball-engaging surface is spaced from one of the tow balls.

16 Claims, 5 Drawing Sheets

TOW-HITCH APPARATUS

FIELD OF THE INVENTION

The present invention relates generally to devices and methods for towing a trailer behind a vehicle, and more particularly, to a universal tow-hitch device which may be used with a variety of towing assemblies.

BACKGROUND OF THE INVENTION

Tow-hitch assemblies are commonly used for towing one vehicle behind another. Such an assembly generally comprises a tow ball that is secured on the rear of a towing vehicle and a coupler or receiver for the tow ball that is attached to the trailer or vehicle to be towed. It is often desirable that the towing vehicle be capable of towing different trailer vehicles that may require different tow balls. Similarly, many trailer vehicles are equipped to be towed with a towing ring or like arrangement.

The present invention overcomes this problem by providing a three tow-ball hitch (a tri-ball hitch) having a ring-accepting structure that is adapted to accept a towing ring.

SUMMARY OF THE INVENTION

In accordance with a preferred embodiment of the present invention, there is provided a tow hitch comprised of an elongated shank of rectangular cross-section. The shank has four side surfaces. A first tow ball of a first dimension is fixedly mounted to a first of the side surfaces. A second tow ball of a second dimension is fixedly mounted to a second of the side surfaces. A third tow ball of a third dimension is fixedly mounted to a third of the side surfaces. The first and the third tow balls are on opposite side surfaces of the shank. A jaw is mounted to the shank for pivotal movement about an axis through the shank. The jaw has a ball-engaging surface, and is movable between a first position wherein the ball-engaging surface engages one of the tow balls and a second position wherein the ball-engaging surface is spaced from the one of the tow balls.

In accordance with another aspect of the present invention, there is provided a tow hitch comprised of an elongated shank of rectangular cross-section. The shank has four side surfaces, and a tow ball of a first dimension is fixedly mounted to one of the side surfaces. A jaw having a pair of spaced-apart leg portions and a ball-engaging surface is provided. The leg portions are dimensioned to straddle the shank, and the jaw is mounted to the shank by a bolt through the leg portions and the shank. The jaw is oriented on the shank wherein the jaw is movable between a first position wherein the ball-engaging surface engages the tow ball and a second position wherein the ball-engaging surface is spaced from the tow ball.

An advantage of the present invention is a tow-hitch apparatus with multiple tow balls and non-tow ball hitch means for attaching to a variety of couplers and hitching members.

Another advantage of the present invention is a tow-hitch apparatus as described above that may be quickly modified from a tow-ball hitch to a hitch that accepts a Lunette eye or ring coupler.

Another advantage of the present invention is a tow-hitch apparatus as described above that has relatively few moving parts.

A still further advantage of the present invention is a tow-hitch apparatus as described above wherein the non-tow ball hitch means does not extend toward the ground when one of the multiple tow balls is in use.

A still further advantage of the present invention is a tow-hitch apparatus as described above that utilizes one of the three tow balls as a means for attaching a Lunette eye or ring coupler.

These and other advantages will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF PREFERRED EMBODIMENT

Figure 1:
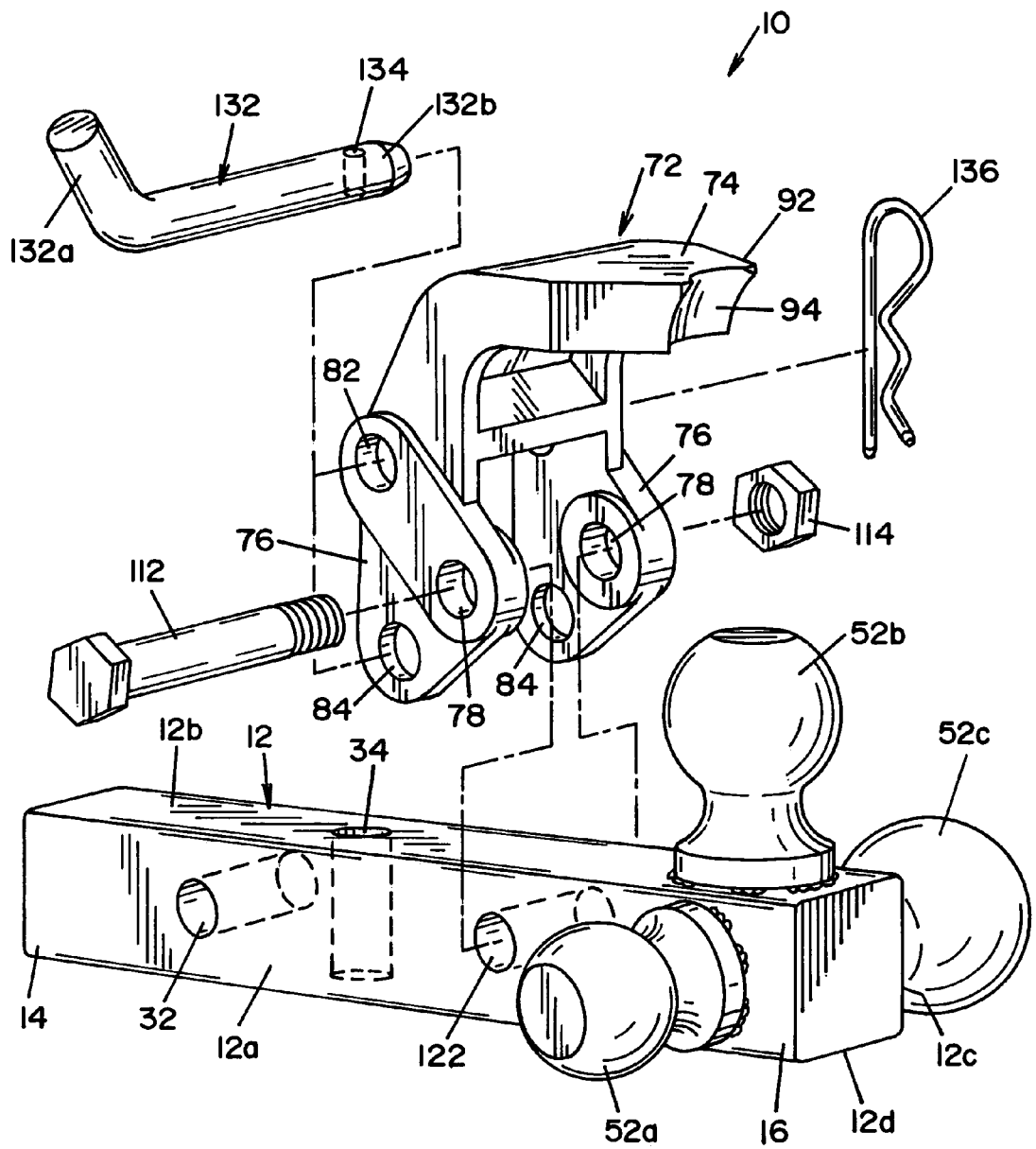
FIG. 1 is an exploded, perspective view of a tow-hitch apparatus, illustrating a preferred embodiment of the present invention.

Referring now to the drawings wherein the showings are for the purpose of illustrating a preferred embodiment of the present invention, and not for the purpose of limiting the same, FIG. 1 shows a tow-hitch apparatus 10, illustrating a preferred embodiment of the present invention. Tow-hitch apparatus 10 includes an elongated shank 12 having a first end 14 and a second end 16. Shank 12 has a rectangular cross-section and has a first side surface 12a, a second side surface 12b, a third side surface 12c, and a fourth side surface 12d.

Figure 2:
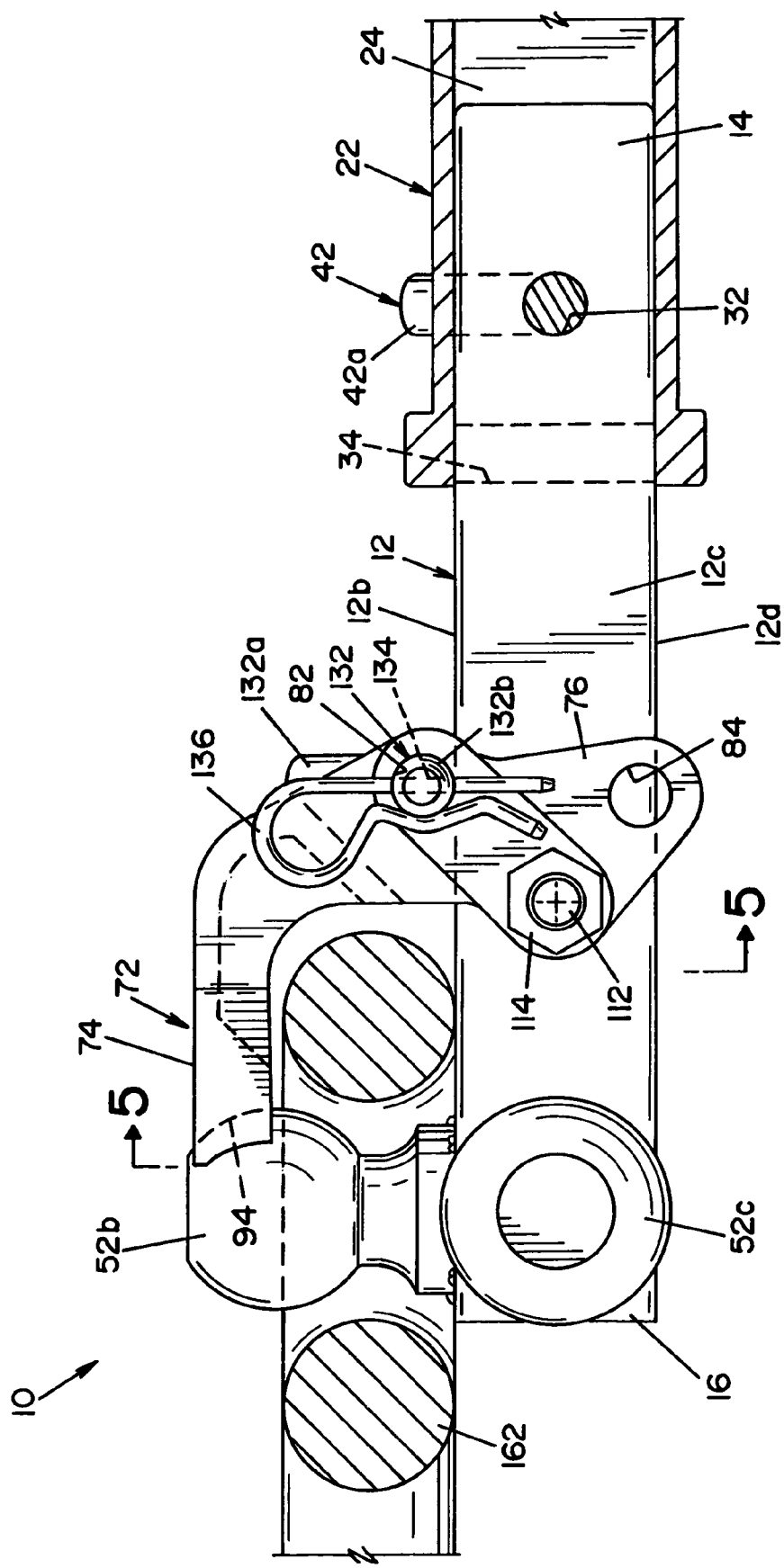
FIG. 2 is a side, elevational view of the tow-hitch apparatus shown in FIG. 1 showing the apparatus accepting a Lunette eye or ring coupler.
Figure 3:
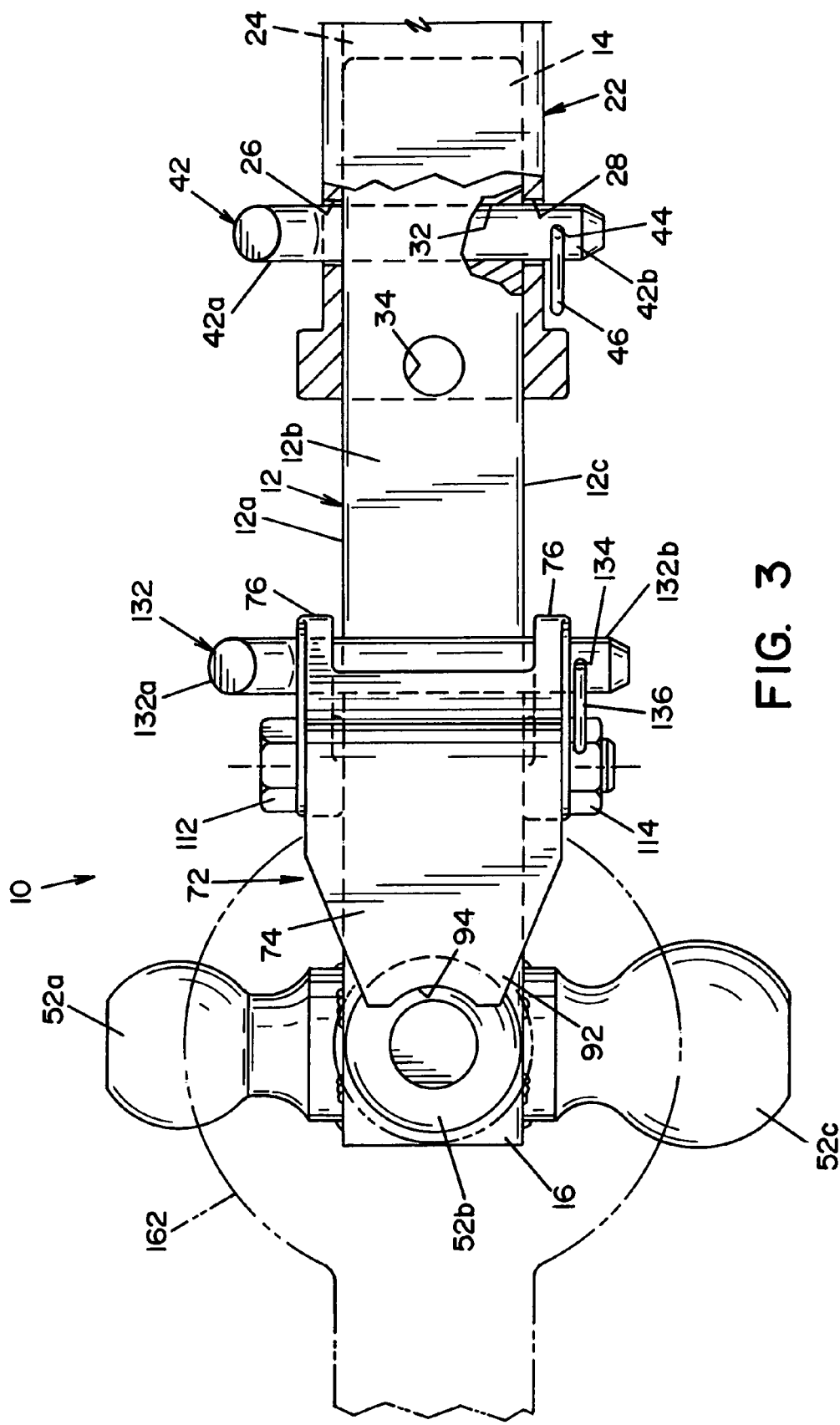
FIG. 3 is a top plan view of the tow-hitch apparatus shown in FIG. 1.
Figure 4:
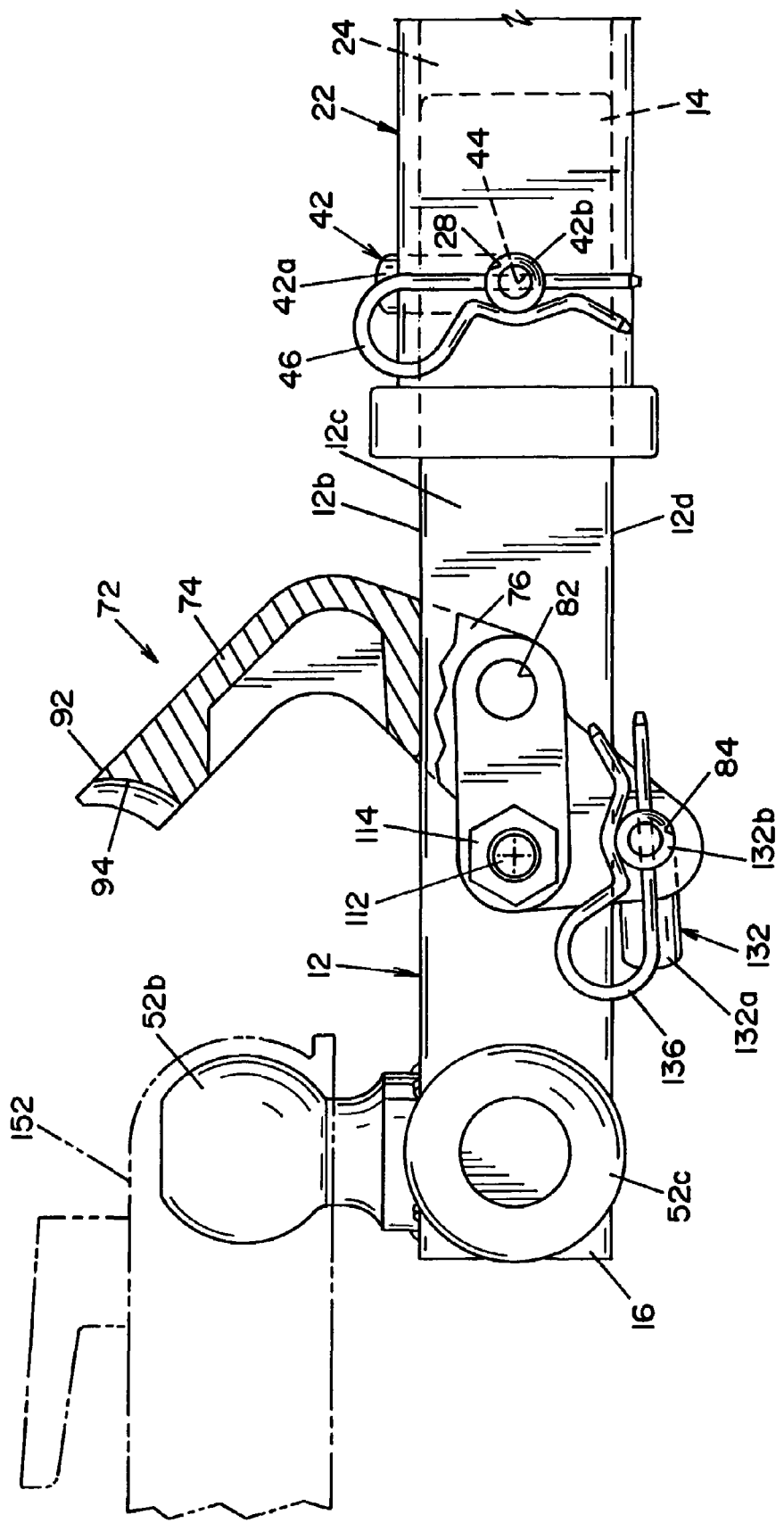
FIG. 4 is a partially-sectioned, side, elevational view of the tow-hitch, showing a tow ball receiver mounted to one of the tow balls.
Figure 5:
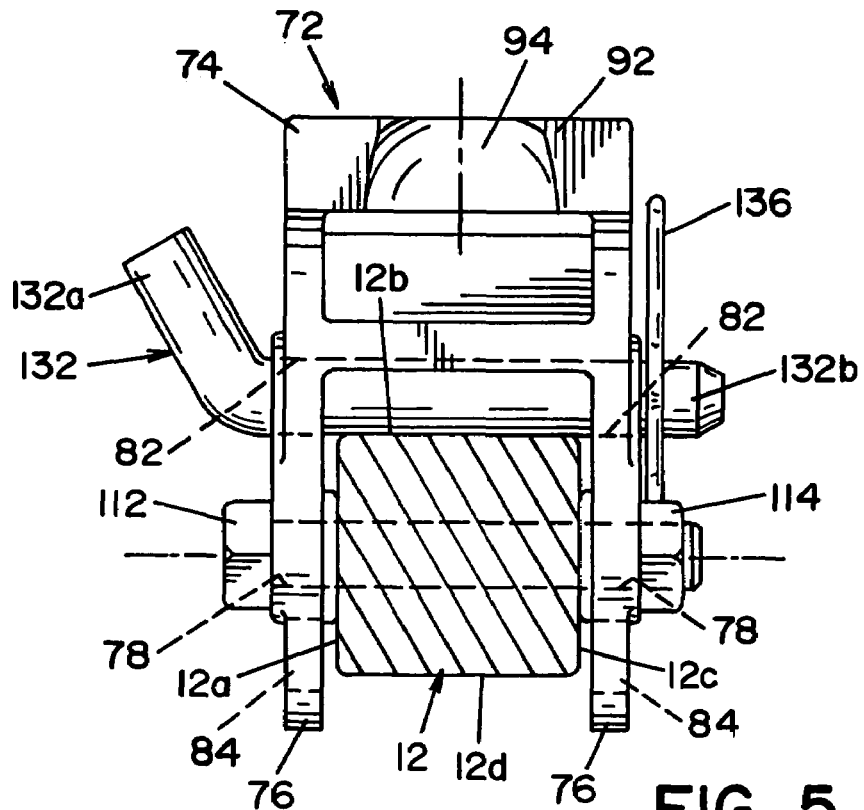
FIG. 5 is a sectional view taken along lines 5—5 of FIG. 2.
Figure 6:
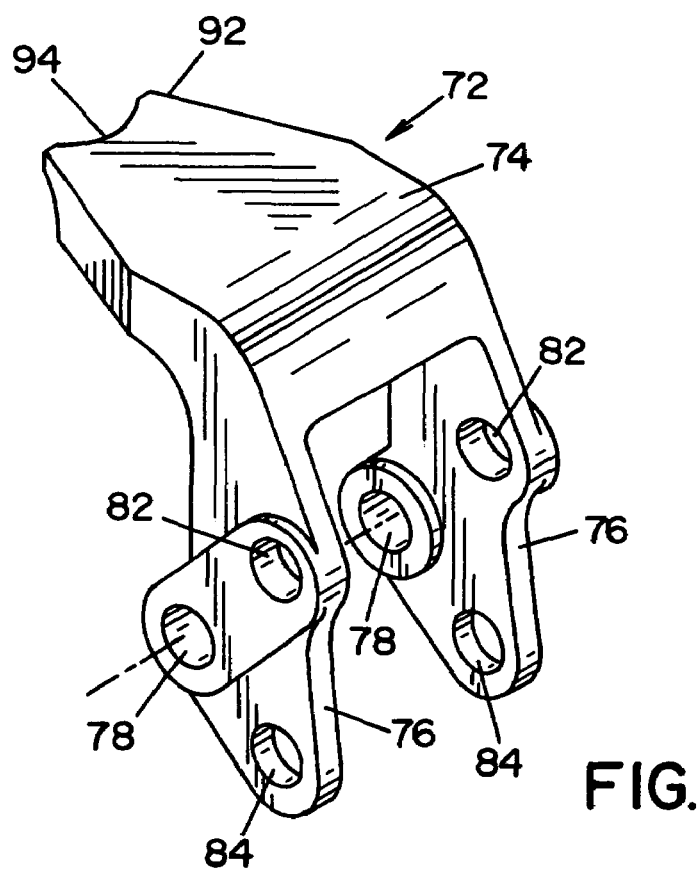
FIG. 6 is a perspective view of a jaw that forms a part of the tow-hitch apparatus.

First end 14 of shank 12 is dimensioned to be received within a receiving mount 22, best seen in FIGS. 2–4, that is attached to a towing vehicle (not shown). Receiving mount 22, in and of itself, forms no part of the present invention, and therefore shall not be described in great detail.

Receiving mount 22 is a tubular structure having an opening 24 of rectangular cross-section extending therethrough. Receiving mount 22 is formed as part of a towing vehicle, or is secured to a towing vehicle by fasteners or welding, in a conventionally known fashion. Two aligned holes 26, 28 (best seen in FIG. 3) are formed in two sides of receiving mount 22. Holes 26, 28 are typically aligned along a common horizontal axis. In this respect, the axis of holes 26, 28 is generally parallel to a road surface.

First end 14 of shank 12 is dimensioned to be slidably received within opening 24 in receiving mount 22, as illustrated in FIGS. 2–4. A first bore 32 extends laterally through shank 12. First bore 32 extends from first side surface 12a to third side surface 12c. A second bore 34 extends through shank 12. Second bore 34 is offset from first bore 32 along the length of shank 12. Second bore 34 extends from second side surface 12b to fourth side surface 12d. Bores 32, 34 are positioned through shank 12 to be alignable with openings 26, 28 in receiving mount 22 depending upon the orientation of shank 12.

A locking pin 42 having a bent, first end 42a and a second end 42b with a hole 44 therethrough is provided to extend through openings 26, 28 in receiving mount 22 and first bore 32 or second bore 34 in shank 12 to lock shank 12 into receiving mount 22. Hole 44 in second end 42b of locking pin 42 is dimensioned to receive a conventional cotter pin 46 to prevent removal of locking pin 42 from holes 26, 28 of receiving mount 22 and first bore 32 or second bore 34 of shank 12.

Referring now to second end 16 of shank 12, a plurality of tow balls are joined to shank 12. Tow balls 52a, 52b, 52c are sized differently to allow tow-hitch apparatus 10 to mate with differently sized couplers. Preferably, first tow ball 52a is coupled to first side face 12a, second tow ball 52b is coupled to second side face 12b and third tow ball 52c is coupled to third side face 12c on shank 12. Each tow ball 52a, 52b, 52c includes a spherical portion and a base portion. Each tow ball 52a, 52b, 52c is fixedly secured to shank 12 preferably by welding. A locking jaw 72 is pivotally mounted to shank 12. Jaw 72 is dimensioned to engage a tow ball, and to form a ring-retaining space between shank 12 and jaw 72. In this respect, jaw 72 is generally "L" shaped and has a generally planar body portion 74 and two spaced-apart leg portions 76 that extend to one side of body portion 74. In the embodiment shown, each leg portion 76 is essentially a mirror image of the other. Each leg portion 76 has a mounting hole 78 formed therethrough. The mounting opening in one leg portion 76 is axially aligned with the mounting hole in the other leg portion 76. Each leg portion 76 also includes a first locking hole 82 and a second locking hole 84. First and second locking holes 82, 84 on one leg portion 76 are aligned respectively with first and second locking holes 82, 84 on the other leg portion 76.

Jaw 72 has a free end 92 that is formed to have a surface 94 to matingly engage one of tow balls 52, 52b, 52c. In the embodiment shown, surface 94 is a spherical surface and is dimensioned to matingly engage the spherical portion of tow ball 52b.

Jaw 72 is dimensioned to be mounted to shank 12 with leg portions 76 straddling shank 12. Jaw 72 is mounted to shank 12 by means of a hex-head bolt 112 extending through mounting openings 78 in leg portions 76, and through a mounting bore 122 in shank 12. Bore 122 extends from first side surface 12a to third side surface 12c. A hex nut 114 maintains hex-head bolt 112 in place. Locking jaw 72 is movable between a first, ball-engaging position, best seen in FIG. 2, and a second, opened position, best seen in FIG. 4.

A locking pin 132 is provided for locking jaw 72 into either the first position or the second position. In this respect, jaw 72 is locked in the first position by locking pin 132 extending through first locking holes 82 in jaw 72. Locking pin 132 has a first bent end 132a and a second end 132b with a hole 134 therethrough. Hole 134 in second end 132b of locking pin 132 is dimensioned to receive a conventional cotter pin 136, as illustrated in FIG. 2. In the position shown in FIG. 2, locking pin 132 prevents clockwise rotation of jaw 72 by engaging side surface 12b of shank 12. Engagement between tow ball 52b and surface 94 of jaw 72 prevents counterclockwise rotation of jaw 72.

In the second position shown in FIG. 4, locking pin 132 extends through second locking holes 84 in jaw 72. Rotation of jaw 72 in a counterclockwise direction about the axis of bolt 112 is prevented by locking pin 132 engaging side surface 12d of shank 12. Rotation of jaw 72 in a clockwise direction is prevented by contact of body portion 74 with surface 12b of shank 12.

The present invention thus provides a tow-hitch apparatus 10 that is capable of towing different trailer vehicles that may require different tow balls or a towing vehicle that is equipped with a towing ring or like arrangement.

Tow-hitch apparatus 10 is used by inserting shank 12 into opening 24 of receiving mount 22. If one of tow balls 52a, 52b or 52c is to be used, shank 12 is oriented within receiving mount 22 to position the desired tow ball in a vertical position. If tow ball 52a or 52c is in use, jaw 72 is preferably locked in the first position engaging tow ball 52b. As illustrated in FIG. 4, if tow ball 52b is to be used for coupling to a tow ball connector (shown in phantom and designated 152 in FIG. 4), jaw 72 is moved and locked into the second, opened position by inserting locking pin 132 through second locking holes 84 in leg portions 76 such that locking pin 132 is disposed beneath side surface 12d.

If a Lunette eye or ring coupler (shown in FIGS. 2 and 3 and designated 162) is to be attached to tow-hitch apparatus 10, jaw 72 is moved to a second position to allow the ring to be inserted over second tow ball 52b, as illustrated in FIG. 4. Jaw 72 is then pivoted to where surface 94 abuts the spherical portion of tow ball 52b. Jaw 72 is locked in this position by inserting locking pin 132 through first locking holes 82 of leg portions 76 and inserting a cotter pin 136 into hole 134 of locking pin 132 to thereby prevent removal of locking pin 132. In this configuration, tow ball 52b acts as a pintle for the ring or Lunette eye.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. A tow hitch, comprised of:
an elongated shank of rectangular cross-section, said shank having four side surfaces;
a first tow ball of a first dimension fixedly mounted to a first of said side surfaces;
a second tow ball of a second dimension fixedly mounted to a second of said side surfaces;
a third tow ball of a third dimension fixedly mounted to a third of said side surfaces, said first and said third tow balls being on opposite side surfaces of said shank;
a jaw mounted to said shank for pivotal movement about an axis through said shank, said jaw having a ball-engaging surface, and being movable between a first position wherein said ball-engaging surface engages one of said tow balls, and a second position wherein said ball-engaging surface is spaced from said one of said tow balls.

2. A tow hitch as defined in claim 1, wherein said tow hitch includes means for locking said jaw in said first position or said second position.

3. A tow hitch as defined in claim 2, wherein said means for locking is a locking pin extending through said jaw.

4. A tow hitch as defined in claim 1, wherein said ball-engaging surface is spherical in shape.

5. A tow hitch as defined in claim 1, wherein said ball-engaging surface engages a spherical portion of said one of said tow balls.

6. A tow hitch as defined in claim 1, wherein said jaw includes two, spaced-apart leg portions that are dimensioned to straddle said shank.

7. A tow hitch as defined in claim 6, wherein said jaw is pivotally mounted to said shank by a bolt extending through said leg portions and said shank.

8. A tow hitch as defined in claim 7, wherein said bolt extends from said first of said side surfaces to said third of said side surfaces, and said ball-engaging surface engages said second tow ball on said second of said surfaces.

9. A tow hitch as defined in claim 6, further comprising locking means for locking said jaw in said first position or said second position.

10. A tow hitch as defined in claim 9, wherein each of said leg portions includes a first locking hole and a second locking hole and said locking means is a pin, said pin locking said jaw in said first position when said locking pin extends through said first locking holes in said leg portions, and locking said jaw in said second position when said locking pin extends through said second locking holes.

11. A tow hitch, comprised of:
- an elongated shank of rectangular cross-section, said shank having four side surfaces;
- a tow ball of a first dimension fixedly mounted to one of said side surfaces;
- a jaw having a pair of spaced-apart leg portions and a ball-engaging surface, said leg portions being dimensioned to straddle said shank, said jaw being mounted to said shank by a bolt through said leg portions and said shank, said jaw being oriented on said shank wherein said jaw is pivotally movable about said bolt between a first position wherein said ball-engaging surface engages said tow ball, and a second position wherein said ball-engaging surface is spaced from said tow ball.

12. A tow hitch as defined in claim 11, further comprising locking means for locking said jaw in said first position or said second position.

13. A tow hitch as defined in claim 12, wherein said locking means is a pin extending through said leg portions of said jaw.

14. A tow hitch, comprised of:
- an elongated shank of rectangular cross-section, said shank having four side surfaces;
- a tow ball of a first dimension fixedly mounted to one of said side surfaces;
- a jaw having a pair of spaced-apart leg portions and a ball-engaging surface, said leg portions being dimensioned to straddle said shank, said jaw being mounted to said shank by a bolt through said leg portions and said shank, said jaw being oriented on said shank wherein said jaw is movable between a first position wherein said ball-engaging surface engages said tow ball, and a second position wherein said ball-engaging surface is spaced from said tow ball; and
- a locking means for locking said jaw in said first position or said second position, wherein said locking means is a pin extending through said leg portions of said jaw;
- wherein each of said leg portions includes a first locking hole and a second hole, wherein said locking pin extends through said first locking holes in said leg portions to lock said jaw in said first position and extends through said second locking holes in said leg portions to lock said jaw in said second position.

15. A tow hitch, comprising:
- an elongated shank of rectangular cross-section, said shank having four side surfaces;
- a first tow ball of a first dimension fixedly mounted to a first of said side surfaces;
- a second tow ball of a second dimension fixedly mounted to a second of said side surfaces;
- a third tow ball of a third dimension fixedly mounted to a third of said side surfaces; and
- a jaw having a pair of spaced-apart leg portions and a ball-engaging surface, said leg portions being dimensioned to straddle said shank, said jaw being mounted to said shank by a bolt through said leg portions and said shank, said jaw being oriented on said shank wherein said jaw is movable between a first position wherein said ball-engaging surface engages one of said tow balls, and a second position wherein said ball-engaging surface is spaced from said one of said tow balls.

16. A tow hitch as defined in claim 15, wherein:
- said first and said third tow balls are on opposite side surfaces of said shank;
- said bolt extends from said first of said side surfaces to said third of said side surfaces; and
- said ball-engaging surface on said jaw engages said second tow ball.

* * * * *